United States Patent [19]
Khandekar et al.

[11] Patent Number: 5,666,556
[45] Date of Patent: Sep. 9, 1997

[54] METHOD AND APPARATUS FOR REDIRECTING REGISTER ACCESS REQUESTS WHEREIN THE REGISTER SET IS SEPARATE FROM A CENTRAL PROCESSING UNIT

[75] Inventors: Narendra Khandekar; Jasmin Ajanovic, both of Folsom, Calif.

[73] Assignee: Intel Corporation, Santa Clara, Calif.

[21] Appl. No.: 710,572

[22] Filed: Sep. 19, 1996

Related U.S. Application Data

[63] Continuation of Ser. No. 177,094, Dec. 30, 1993.

[51] Int. Cl.⁶ ............................................. G06F 12/06
[52] U.S. Cl. ........................ 373/822; 395/823; 395/829; 711/202
[58] Field of Search ........................... 395/406, 412, 395/413, 822, 823, 829

[56] References Cited

U.S. PATENT DOCUMENTS

| | | | |
|---|---|---|---|
| 4,145,738 | 3/1979 | Inoue et al. | 395/419 |
| 4,228,504 | 10/1980 | Lewis et al. | 395/411 |
| 4,378,590 | 3/1983 | Kim | 364/200 |
| 4,493,020 | 1/1985 | Kim et al. | 364/200 |
| 4,574,349 | 3/1986 | Rechtschaffen | 364/200 |
| 4,623,962 | 11/1986 | Matsumoto et al. | 395/800 |
| 4,829,425 | 5/1989 | Bain, Jr. et al. | 395/800 |
| 4,853,849 | 8/1989 | Bain, Jr. et al. | 395/412 |
| 4,918,598 | 4/1990 | Ashkin et al. | 395/823 |
| 4,992,938 | 2/1991 | Cocke et al. | 364/200 |
| 5,119,290 | 6/1992 | Loo et al. | 395/420 |
| 5,179,681 | 1/1993 | Jensen | 395/445 |
| 5,226,126 | 7/1993 | McFarland | 395/575 |
| 5,243,700 | 9/1993 | Larsen et al. | 395/822 |
| 5,280,586 | 1/1994 | Kunz et al. | 395/822 |
| 5,280,588 | 1/1994 | D'Ambrose et al. | 395/823 |
| 5,367,640 | 11/1994 | Hamilton et al. | 395/829 |
| 5,410,662 | 4/1995 | Hilton et al. | 395/402 |
| 5,437,042 | 7/1995 | Culley et al. | 395/200.07 |
| 5,444,852 | 8/1995 | Nakabayashi | 395/823 |
| 5,454,092 | 9/1995 | Sibigtroth | 395/412 |
| 5,455,919 | 10/1995 | Brewer et al. | 395/402 |
| 5,481,755 | 1/1996 | Harper et al. | 395/823 |
| 5,499,352 | 3/1996 | Clift et al. | 395/412 |
| 5,513,376 | 4/1996 | Lohmeyer | 395/873 |
| 5,548,778 | 8/1996 | Hirayama | 395/823 |
| 5,594,879 | 1/1997 | Belmont | 395/309 |

OTHER PUBLICATIONS

"Prism with a Million Gates", Bemis, The Electronic System Design Magazine, vol. 19, Jan. 1989, 5 pages.

"An Introduction to Windows NT Memory Management Fundamentals" Yao, Microsoft System Journal, 10 pages.

*Primary Examiner*—Tod R. Swann
*Assistant Examiner*—Keith W. Saunders
*Attorney, Agent, or Firm*—Blakely, Sokoloff, Taylor & Zafman

[57] ABSTRACT

A register address space is defined with a capacity large enough to accommodate substantial growth in the number of required registers. Unused register locations are reserved for future use. Access requests directed to reserved addresses are redirected to a physical register containing the same stored value that would be returned if a physical register were associated with the reserved address to which the access was originally directed. The physical register is separate from any central processing unit.

5 Claims, 4 Drawing Sheets

METHOD AND APPARATUS FOR REDIRECTING REGISTER ACCESS REQUESTS WHEREIN THE REGISTER SET IS SEPARATE FROM A CENTRAL PROCESSING UNIT

This is a continuation of application Ser. No. 08/177,094 filed Dec. 30, 1993.

BACKGROUND OF THE INVENTION

1. Field of the Invention

This invention relates generally to the field of data processing systems, and particularly to a method and apparatus for controlling access requests in a register address space.

2. Background Art

Most present day personal and workstation computers are organized as shown in FIG. 1. A central processing unit (CPU) 10 is coupled to a local CPU bus 12 as is the main memory 14. A cache memory 16 may also be coupled to bus 12. Communication with peripheral devices 22 is accomplished over an expansion bus 20 coupled to input/output (I/O) port 18. A number of expansion bus standards have been developed. One such standard is the industry standard architecture (ISA) bus that is widely used in personal computer systems. More recently, the extended ISA (EISA) bus has been developed. This is a superset of the ISA bus that includes all ISA bus features, together with extensions to enhance system performance and capabilities. Both the ISA bus and EISA bus have relatively narrow bandwidths in comparison to the bandwidth available on local busses for state-of-the-art high performance CPUs. This results in I/O bottlenecks and limits the ability of the system to service high performance peripherals such as local area network (LAN), Small Computer Serial Interface (SCSI), graphics and video.

In order to deal with the inherent limitations of earlier generation expansion bus standards, a new bus standard designated the "Peripheral Component Interconnect" (PCI) bus has been developed. PCI is a fast local bus particularly adapted for servicing high performance peripheral units. A typical system employing a PCI bus is illustrated in FIG. 2. Here, CPU 10 is coupled to CPU bus 12 as in the previously described system. A PCI/host bridge unit 30 is coupled to CPU bus 12 to provide the interface with PCI bus 32. PCI/host bridge unit 30 preferably also includes the management functions for the main memory 14 and cache memory 16. PCI compatible peripheral units 34 are connected to the PCI bus.

In order to maintain system compatibility with peripheral units designed to operate with earlier generation ISA/EISA expansion busses, a PCI/expansion bus bridge unit 40 is coupled between the PCI bus and the ISA or EISA expansion bus 20. A system such as shown in FIG. 2 is thus able to take advantage of the increased performance capabilities of the PCI bus while maintaining access to the large existing base of ISA and EISA expansion cards and their corresponding software applications.

The PCI bus is particularly designed to address the growing need for a standardized local bus that is not directly dependent on the speed and size of the CPU bus. New generations of personal computer system software with sophisticated graphical interfaces, multi-tasking and multi-threading bring new requirements that traditional PC input/output architectures cannot satisfy. As indicated in FIG. 2, the input/output functions of the system are decoupled from the processor and memory assets, thereby enabling the input/output design of the system to remain stable over multiple generations of processor and/or memory technology. Regardless of new requirements or technology applied on the CPU side of the host bridge, the PCI side may remain unchanged, which allows re-usability of not only the remainder of the platform chip set, including the PCI/expansion bus bridge, but also all of the other I/O functions interfaced at both the PCI and expansion bus levels.

The PCI/expansion bus bridge unit 40 integrates several bus functions on both the PCI and expansion busses. For the PCI local bus, the functions include PCI local bus arbitration and default bus driver. In the case of an EISA expansion bus, the central functions include the EISA bus controller, EISA arbiter and EISA data swap logic. The PCI/EISA bridge also integrates system functions, including PCI parity and system error reporting, buffer coherency management protocol, PCI and EISA memory and I/O address mapping and decoding. For maximum flexibility, all of these functions are programmable, thereby allowing for a variety of optional features. A particular PCI/EISA bridge set has been developed for the Intel Pentium™ processor. This chip set is illustrated in FIG. 3 and comprises a PCI/EISA bridge (PCEB) and a EISA system component (ESC). These two components work in tandem to provide an EISA I/O subsystem interface for personal computer platforms based on the Pentium™ processor chip and PCI bus standard.

The hierarchy of the CPU bus as the execution bus, PCI local bus as a primary I/O bus and EISA bus as a secondary I/O bus allows concurrency for simultaneous operations in all three bus environments. Data buffering permits concurrency for operations that cross over from one bus environment to another. For example, a PCI device may post data into the PCEB, permitting the PCI local bus transaction to complete in a minimum time and freeing up the PCI local bus for further transactions. The PCI device need not wait for the transfer to complete to its final destination. Meanwhile, any ongoing EISA bus transactions are permitted to complete. The posted data will then be transferred to its EISA bus destination when the EISA bus is available. The PCEB-ESC chip set implements extensive buffering for PCI-to-EISA and EISA-to-PCI bus transactions. In addition to concurrency for the operation of the cross-bus environments, data buffering allows advantage to be taken of the fastest operations within a particular bus environment via PCI burst transfers and EISA burst transfers.

The PCI local bus with 132 MByte/second and EISA with 33 MByte/second peak data transfer rates represent bus environments with significantly different bandwidths. Without buffering, transfers that cross between bus environments would be performed at the speed of the slower bus. Data buffers provide a mechanism for data rate adoption so that the usable bandwidth of the fast bus environment (PCI) is not significantly impacted by the slower bus environment (EISA).

The PCEB can be either a master or slave on the PCI local bus and it is optimized for bus frequencies from 25 megahertz to 33 megahertz. For PCI-initiated transfers, the PCEB functions only as a slave. For EISA-initiated transfers to the PCI local bus, the PCEB is a PCI master. The PCEB contains a fully EISA-compatible master and slave interface. The PCEB directly drives eight EISA slots without external data or address buffering. The PCEB functions as a master or slave on the EISA bus only for transfers between the EISA bus and PCI local bus. For transfers confined to the EISA bus, the PCEB functions neither as a master nor slave. However, the data swap logic contained in the PCEB is involved in such transfers if data size translation is required.

The ESC implements system functions, such as timer/counter, direct memory access (DMA), and interrupt controller. The ESC also implements EISA sub-system control functions, such as EISA bus controller and EISA bus arbiter.

SUMMARY OF THE INVENTION

The present invention implements a virtual register set. A register address space is defined with a capacity large enough to accommodate substantial growth in the number of required registers. When the full extent of the register address space is not required, it is necessary to provide for access requests directed to any address within the address space, whether such request is intended or not. Rather than provide a physical register corresponding to each address in the register address space, requests directed to "reserved" addresses are redirected to a physical register containing the same stored value that would be returned if a physical register were associated with the reserved address to which the access was originally directed.

In the case where there is a large number of reserved read-only register addresses, all of which return the same stored value, a single physical register is sufficient for handling access requests to any one of such reserved register addresses. This approach can provide substantial hardware savings.

DETAILED DESCRIPTION OF THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. In certain instances, detailed descriptions of well-known data processing techniques, devices and circuits are omitted so as to not obscure the description of the present invention with unnecessary detail.

The PCI makes extensive use of configuration registers. A slot-based "configuration space" is defined that allows each PCI device up to 256 8-bit configuration registers. Each PCI device has its own configuration space. The configuration registers have three types of access attributes:

Read Only (RO). If a register is read only, writes to this register have no effect.

Read/Write (R/W). A register with this attribute can be read and written.

Read/Write Clear (R/WC). A register bit with this attribute can be read and written. However, a write of a one clears (sets to zero) the corresponding bit and a write of a zero has no effect.

The size of the PCI configuration space is sufficient to accommodate all presently foreseeable requirements of PCI devices. Accordingly, most PCI devices will not utilize the entire configuration space. In fact, the majority of PCI devices will likely utilize only a small fraction of the configuration space. For example, the PCEB configuration space defines only 26 configuration registers. The remainder of the configuration address space is reserved. The PCEB responds to accesses to the reserved address locations by completing the PCI bus cycle. When a reserved register location is read, the default value 0000 h is returned. The reserved register locations are, in effect, read only, i.e., writes have no effect.

Figure 1:
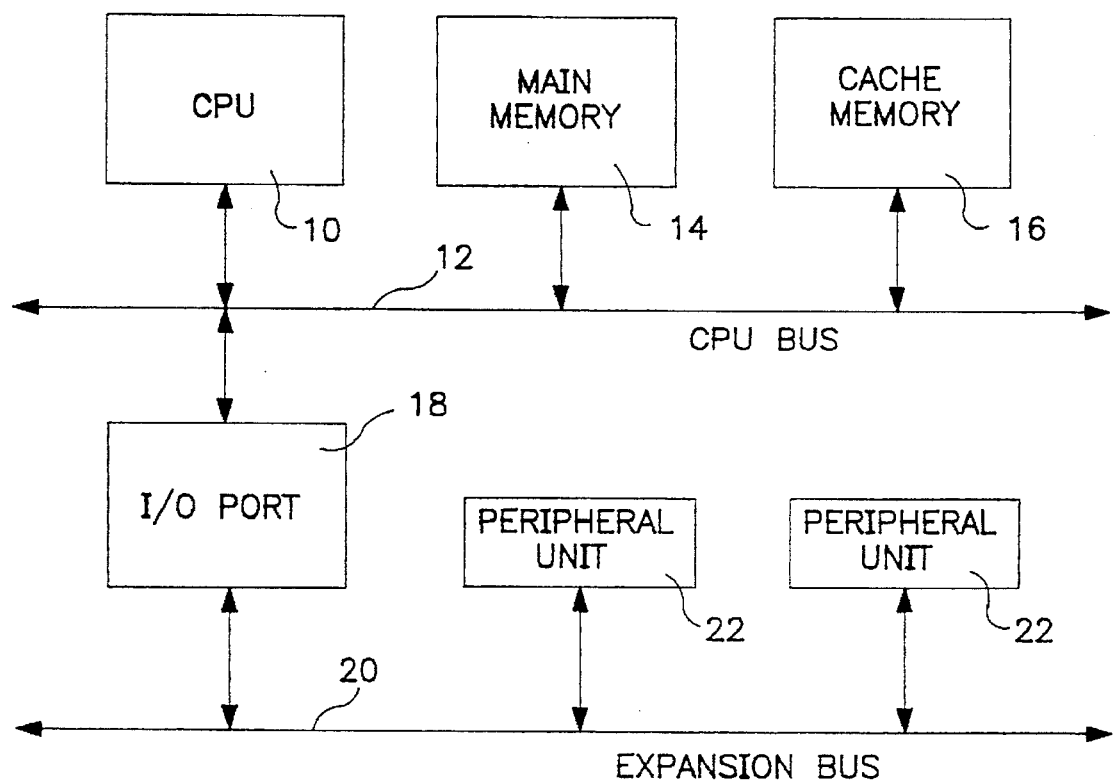
FIG. 1 is a simplified block diagram of a prior art computer system.
Figure 2:
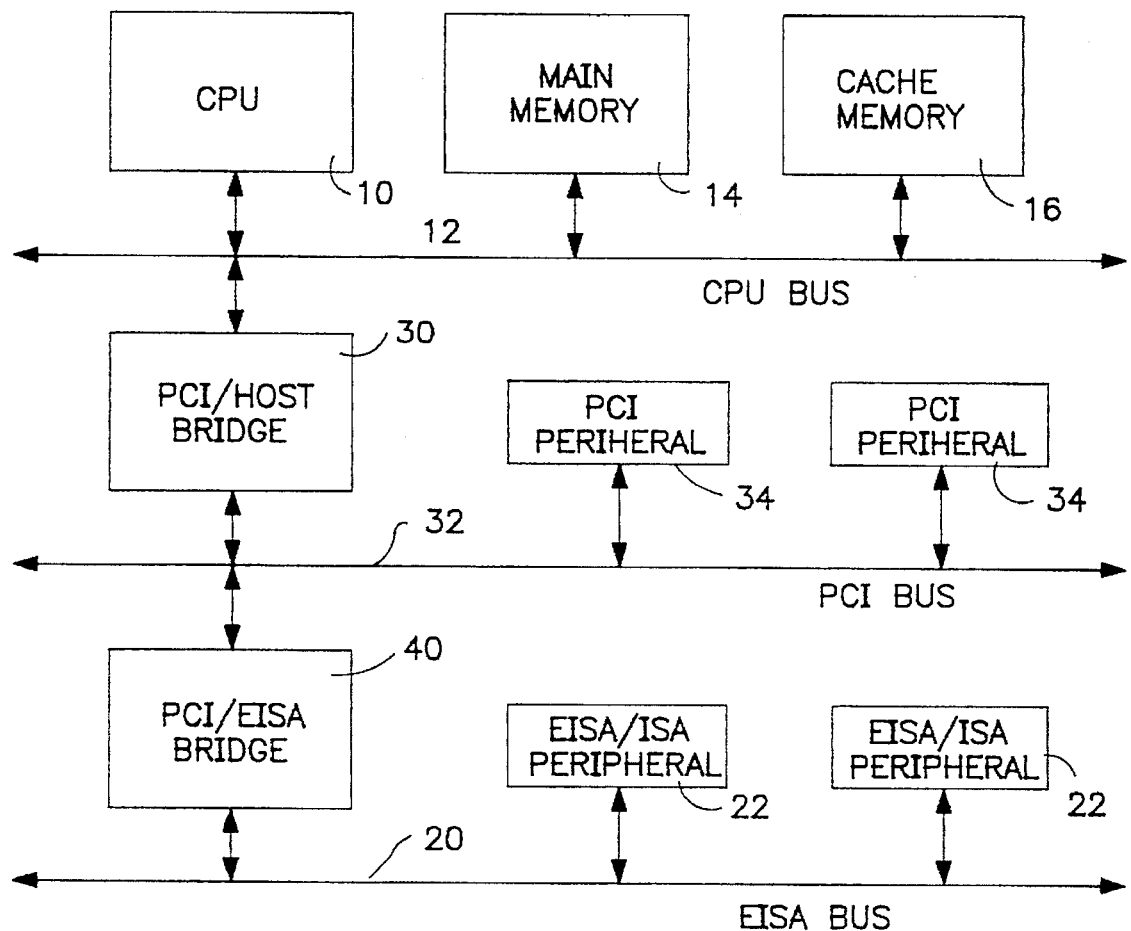
FIG. 2 is a simplified block diagram of a computer system incorporating a Peripheral Component Interconnect (PCI) bus.
Figure 3:
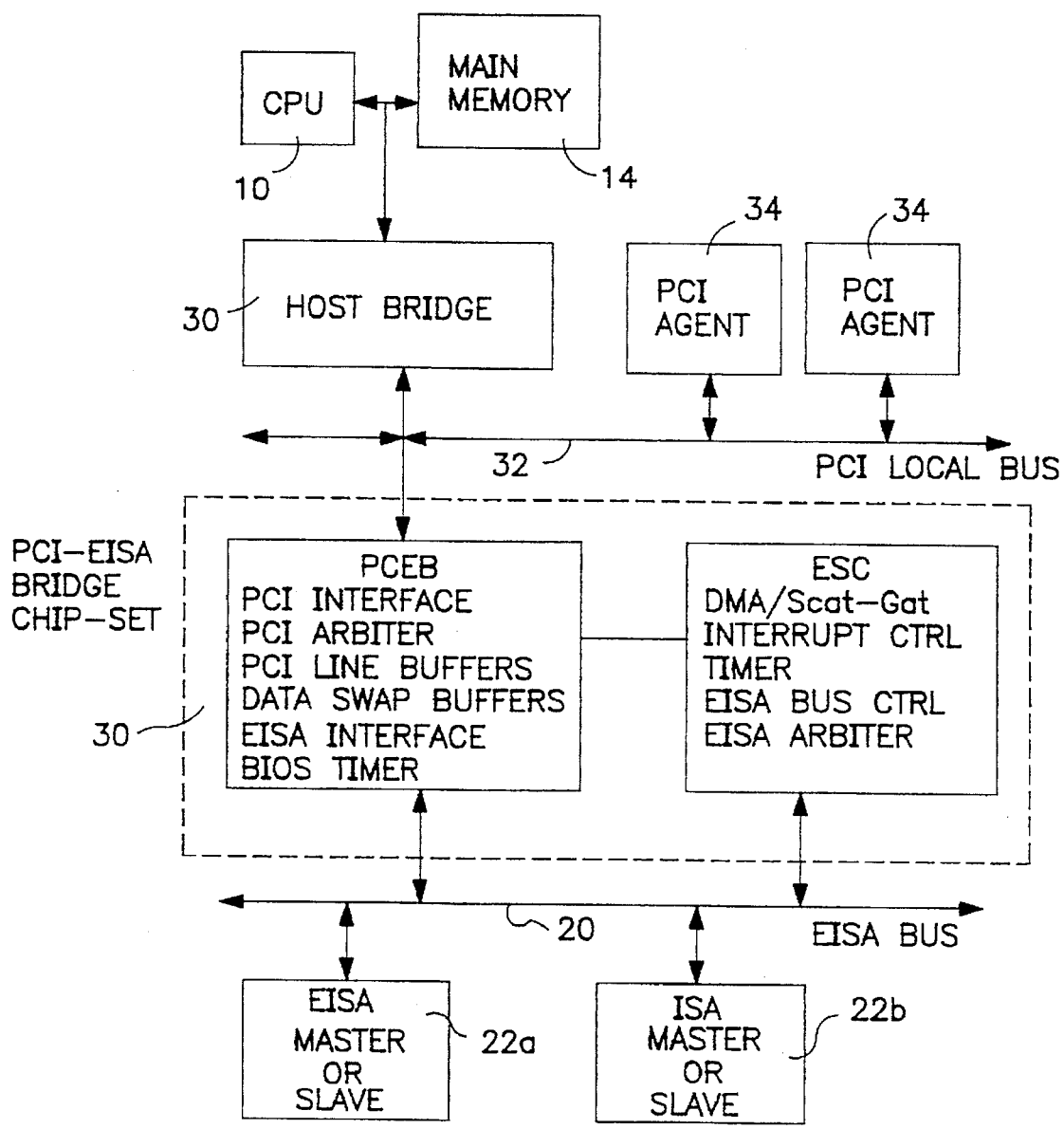
FIG. 3 is a simplified block diagram of a PCI/expansion bus bridge.
Figure 4:
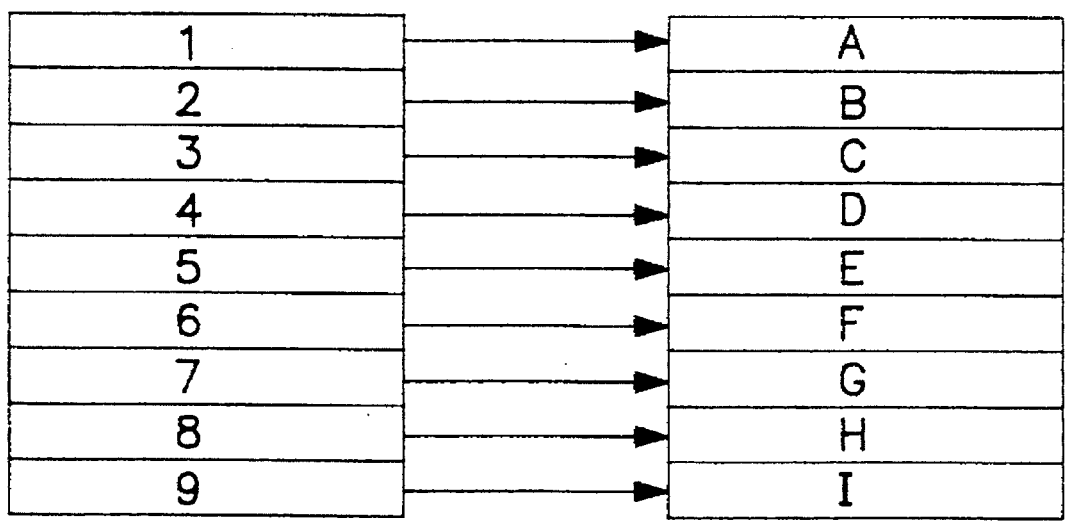
FIG. 4 illustrates a conventional translation from a register address space to physical registers.

A conventional approach for handling reserved register locations is illustrated in FIG. 4. Each location in the register address space is associated with a corresponding physical register. For read only registers, each such register is filled with the appropriate data value or, in the case of reserved registers, a default value. Clearly, this approach requires a large number of components to realize a physical register set in a large address space.

Figure 5:
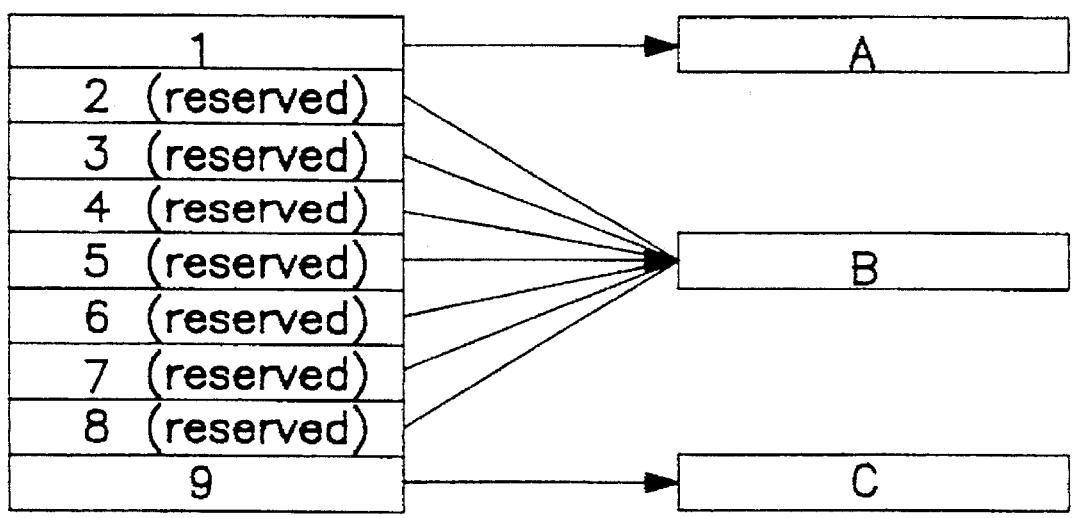
FIG. 5 illustrates a translation from a register address space to physical registers in accordance with the present invention.

The technique employed with the present invention is illustrated in FIG. 5. Here, reserved register locations 2–8 are mapped to a single physical register B. Thus, in this example, there is a saving of six physical registers. Although this example shows that a contiguous subset of the register locations are mapped to physical register B, the invention is not limited in this regard. Any subset of the register address space, whether comprising contiguous or noncontiguous locations, may be mapped to a single physical register. A straightforward logical gating scheme is used to decode the addresses of the reserved register locations and to generate a chip select signal for the physical registers. Where the number of reserved register locations is large, the savings realized by eliminating physical registers far outweighs the cost of the address decoding network. In the case of the PCEB, implementation of a virtual register set in this manner resulted in a net savings of approximately 3500 gates.

It should be understood that the present invention is not limited to the foregoing example of a configuration address space using PCI protocol. This invention has wide application in data processing systems wherever it is desirable to define a register address space, some significant part of which will comprise read-only registers sharing the same stored value, such as is the case when register locations are reserved for future use.

It will be recognized that the above described invention may be embodied in other specific forms without departing from the spirit or essential characteristics of the disclosure. Thus, it is understood that the invention is not to be limited by the foregoing illustrative details, but rather is to be defined by the appended claims.

What is claimed is:

1. A method of controlling access requests in a register address space comprising the steps of:

(a) defining an address space containing a plurality of register addresses;

(b) providing a physical register set having a plurality of members, said plurality of members of the register set being fewer than the plurality of register addresses, wherein the physical register set is in a peripheral unit separate from a central processing unit;

(c) associating, on a one-to-one basis, a first subset of register addresses with a corresponding first subset of the register set such that an access request to any one of the first subset of register addresses is directed to the corresponding associated register;

(d) associating a second subset of register addresses with a single member of the register set which is not a member of the first subset of the register set such that an access request to any one of the second subset of register addresses is directed to said single member of the register set.

2. The method of claim 1 wherein the access request comprises a read request.

3. The method of claim 1 wherein said single member of the register set is a read-only register.

4. A data processing system comprising:

(a) a communications bus;

(b) at least one requesting unit coupled to the communications bus for requesting data from a plurality of register locations within an address space;

(c) at least one responding unit coupled to the communications bus having a set of physical registers, said responding unit being separate from a central processing unit;

(d) means for associating, on a one-to-one basis, a first subset of register locations with a corresponding first subset of the set of physical registers such that an access request to any one of the first subset of register addresses is directed to the corresponding associated register;

(e) means for associating a second subset of register locations with a single member of the set of physical registers which is not a member of the first subset of physical registers such that an access request to any one of the second subset of register addresses is directed to said single member of the register set.

5. A method of controlling access requests in a register address space comprising the steps of:

(a) defining an address space containing a plurality of register addresses;

(b) providing a physical register set having a plurality of members, said plurality of members of the register set being fewer than the plurality of register addresses;

(c) associating, on a one-to-one basis, a first subset of register addresses with a corresponding first subset of the register set such that an access request to any one of the first subset of register addresses is directed to the corresponding associated register;

(d) associating a second subset of register addresses with a single member of the register set which is not a member of the first subset of the register set such that an access request to any one of the second subset of register addresses is directed to said single member of the register set, wherein said single member of the register set is a read-only register.

* * * * *